No. 782,143. PATENTED FEB. 7, 1905.
F. G. KOEHLER.
CAR BRAKE.
APPLICATION FILED DEC. 21, 1903.
2 SHEETS—SHEET 1.
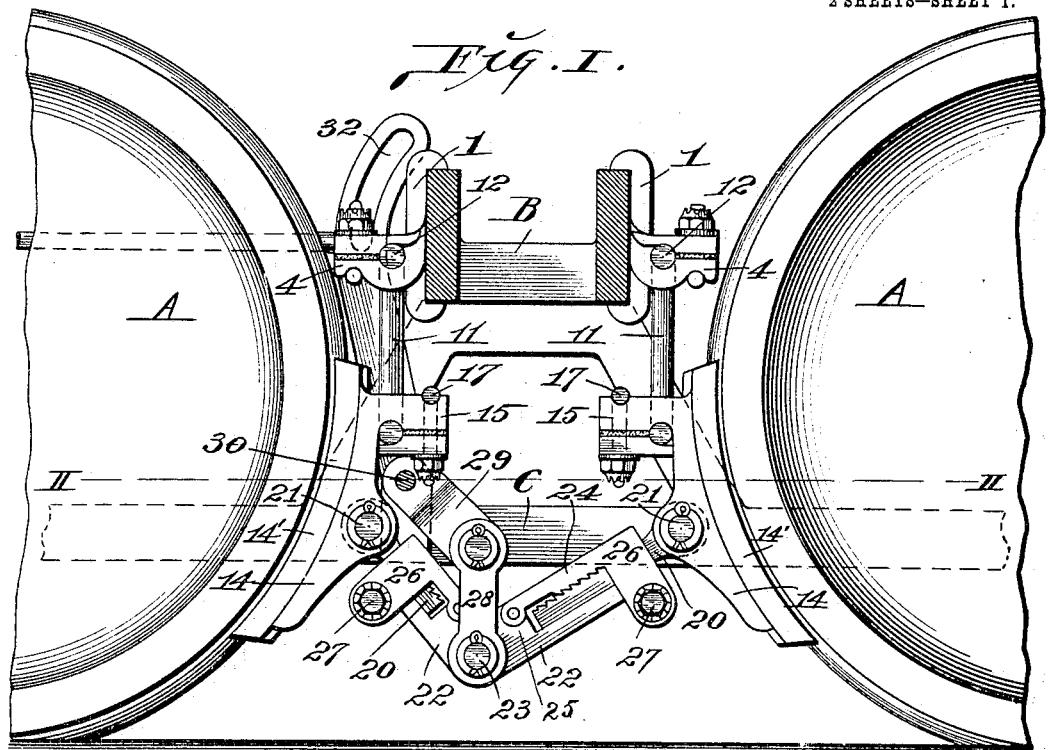
Fig. I.
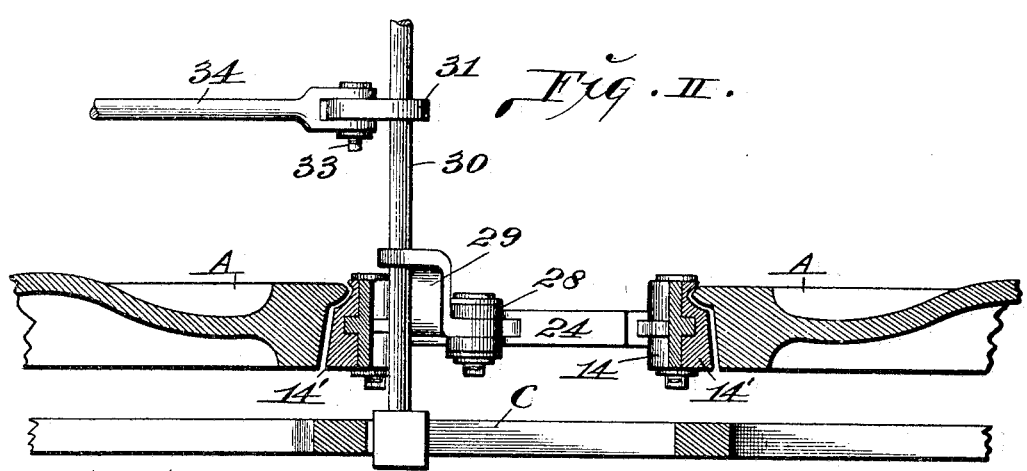
Fig. II.
Attest:—
M. F. Smith
Blanche Hogan
Inventor:—
Frank G. Koehler:
By Wright Bro
Attys.

No. 782,143. PATENTED FEB. 7, 1905.
F. G. KOEHLER.
CAR BRAKE.
APPLICATION FILED DEC. 21, 1903.
2 SHEETS—SHEET 2.
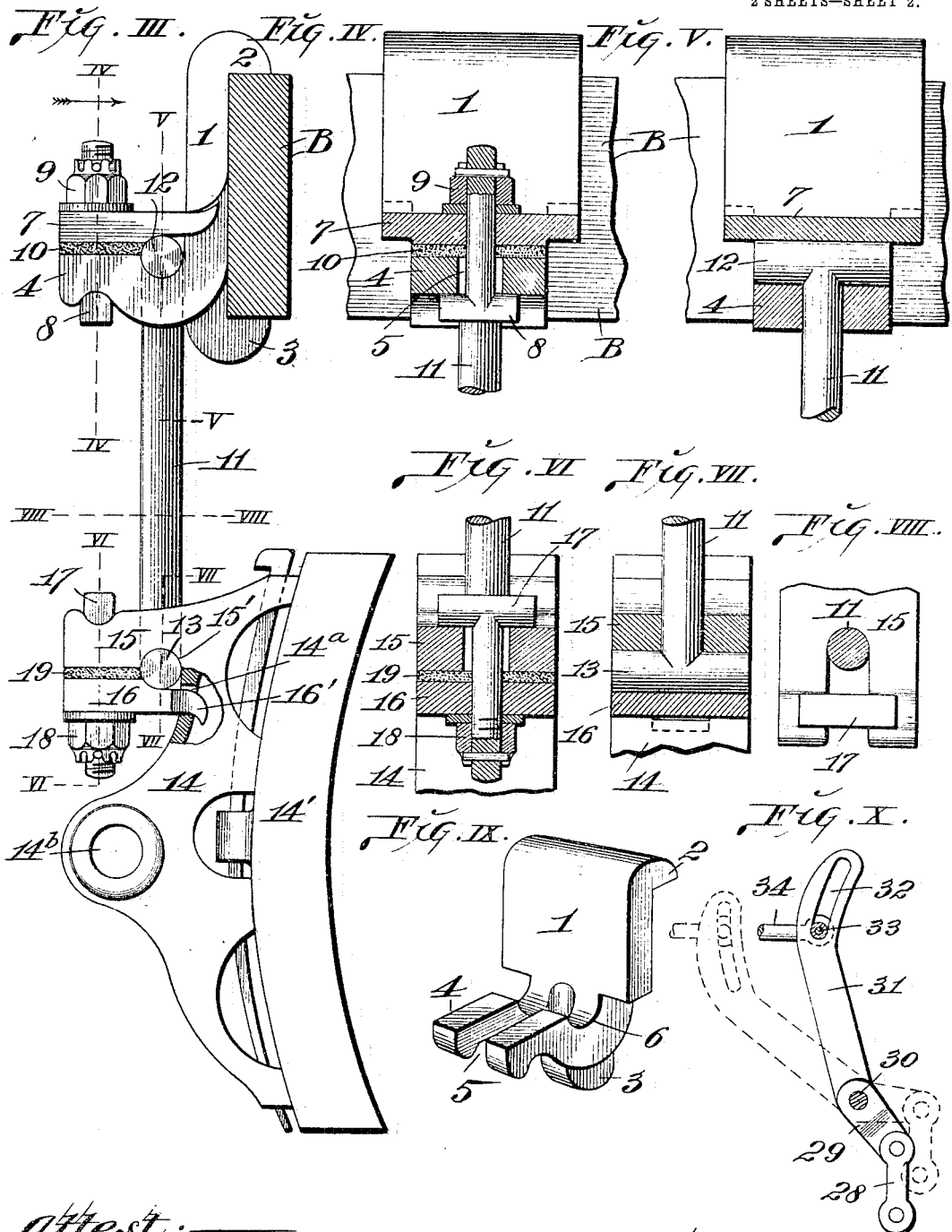

No. 782,143.

Patented February 7, 1905.

UNITED STATES PATENT OFFICE.

FRANK G. KOEHLER, OF ST. LOUIS, MISSOURI.

CAR-BRAKE.

SPECIFICATION forming part of Letters Patent No. 782,143, dated February 7, 1905.

Application filed December 21, 1903. Serial No. 186,011.

*To all whom it may concern:*

Be it known that I, FRANK G. KOEHLER, a citizen of the United States, residing in the city of St. Louis, in the State of Missouri, have invented certain new and useful Improvements in Car-Brakes, of which the following is a full, clear, and exact description, reference being had to the accompanying drawings, forming part of this specification.

My invention relates to a brake for use upon steam-cars or street-cars, and has for its object to provide a construction in which the slack in the brake-head-operating mechanism may be readily and efficiently adjusted; also, a construction by which the leverage action of the brake-setting mechanism is increased; also, a novel construction of hangers for the brake-heads.

The invention consists in features of novelty hereinafter fully described, and pointed out in the claims.

Figure I is a side elevation of my brake shown applied to a pair of car-wheels. Fig. II is a horizontal section taken on lines II II, Fig. I. Fig. III is an enlarged elevation of one of the brake-shoes and its supports. Fig. IV is a vertical section taken on line IV IV, Fig. III. Fig. V is a vertical section taken on line V V, Fig. III. Fig. VI is a vertical section taken on line VI VI, Fig. III. Fig. VII is a vertical section taken on line VII VII, Fig. III. Fig. VIII is a horizontal section taken on line VIII VIII, Fig. III. Fig. IX is a perspective view of one of the hanger-brackets by which the brake-heads are supported. Fig. X is a view in detail of one of the brake-rod-receiving levers.

A designates a pair of car-wheels, and B the transom of a car-truck.

1 designates hanger-brackets that are fitted to the transom B, to which they are secured by any suitable means, such as bolts passed through the brackets and the transom. Each bracket has an upper lip 2, that fits over the top of the transom, and a lower lip 3, that engages beneath the transom.

4 designates horizontal arms projecting from the main bodies of the brackets at right angles thereto, these arms being rendered of bifurcated form due to slots 5 extending longitudinally thereof, as seen in Figs. IV and IX. In each arm 4 is a seat 6, that extends transversely of the arm. The arms 4 are surmounted by caps 7, that are held to said arms by T-bolts 8, which pass upwardly through the slots in the arms and the caps and are held by nuts 9. Interposed between the arms and caps are packing-washers 10, that permit of the caps being held more or less tightly to the hanger-bracket arms.

11 designates hanger-rods provided at their upper ends with T-heads 12, the arms of which are pivotally seated in the seats 6 of the hanger-bracket arms. (See Figs. I, III, and V.) The lower end of each hanger-rod is furnished with a T-head 13. (See Figs. I, III, and VII.)

14 designates brake-heads which carry the usual shoes 14'. Each of these brake-heads is furnished with a rearwardly-projecting bifurcated arm 15, containing in its under side a seat 15', that receives the arms of the lower T-head 13 of the corresponding hanger-rod 11.

16 designates caps secured to the bifurcated brake-head arms by T-bolts 17, that pass through said members and are provided with nuts 18. Each of the caps 16 is furnished with a point 16', that rests in an aperture 14ª in the brake-head. (See Fig. III.) Between the brake-head arms 14 and the caps 16 are packing-washers 19, similar to those 10. The caps 16 bear against the T-heads 13 of the hanger-rods 11 and serve to retain said heads in their seats 15'.

From the foregoing it will be seen that by the use of the hanger-brackets 1 and the parts associated therewith and the arms 15 of the brake-heads and the parts associated therewith and the hanger-rods 11, having their T-heads loosely seated in said hanger-brackets, and brake-head arms the brake-heads are so supported as to be subject to swinging motion to permit of their approach to and recession from the perimeters of the car-wheels with which they are associated.

Each of the brake-heads 14 is provided with a central transverse aperture 14ᵇ. (See Fig. III.)

20 designates rack-bars that are connected to the brake-heads by pivot-bolts 21. (See Fig. I.) These rack-bars enter into a pair of links 22, that are pivoted to each other by a connecting-bolt 23. The links are recessed to receive said rack-bars and have connected to them latches 24, that are pivoted at 25 to each link and bear stirrups 26, that straddle the outer ends of the links. In the stirrups 26 are bolts 27, by which the latches 24 are held in alinement with the links 22 when the rack-bars 20 are positioned between the links and latches. This construction of links, rack-bars, and latches forming connection between a pair of brake-heads constitutes a series of members that provides a slack-adjusting arrangement whereby the pressure brought to bear against either brake-head may be adjusted by shifting either rack-bar 20 inwardly or outwardly when the latches 24 are moved away from the rack-bars 20 to permit of their being slipped longitudinally with respect to the links and latches. No invention *per se* is herein claimed for this slack-adjusting arrangement, it being made the subject-matter for separate application for patent, Serial No. 186,012, filed of even date herewith and to which reference may be had for a more full understanding of its construction.

28 designates a link loosely connected at its lower end to the connecting-bolt 23 which unites the links 22. The upper end of this link has pivoted to it a rocker 29, that is fixed to a rock-shaft 30, journaled in suitable supports carried by the car-truck frame C. (See Figs. I and II.)

31 is a rocking lever fixed to the rock-shaft 30. (See Figs. I, II, and X.) This rocking lever is provided in its upper free end with a slot 32, that receives a pin 33, which rides in said slot and serves to connect a freely-movable brake-rod 34 to said rocking lever. By this construction of parts when the brake-rod 34 is actuated to apply the brakes the pin 33 in said rod operates in the slot 32, extending longitudinally of the rocking lever, moving from the inner end of said slot gradually to its outer end, thereby becoming more and more remote from the rock-shaft to which the rocking lever is fixed and gradually increasing the leverage obtained through the medium of said rocking lever as the brake-rod is drawn upon in applying the brakes, during which action the brake-rod swings vertically to permit the travel of the pin 33, due to the free mounting in said rod. The brakes may therefore be set with a diminished expenditure of power, owing to such increased leverage, the setting thereof being accomplished through the rotation of the rock-shaft 30, the upward movement of the rocker 29 and link 28, which latter in turn acts to elevate the connected ends of the links 22 to spread the brake-heads apart and set the brake-shoes to the perimeters of the car-wheels.

I claim as my invention—

1. In a car-brake, the combination of brake-heads, hanger-brackets, hanger-rods having T-heads seated in said brackets, caps confining said T-heads, T-heads carried by the lower ends of said hanger-rods, and caps securing said last-named T-heads to the brake-heads, substantially as set forth.

2. In a car-brake, the combination of hanger-brackets having bifurcated arms, caps secured to said arms, brake-heads having bifurcated arms, caps secured to said brake-head arms, hanger-rods, and T-heads carried by said hanger-rods seated between said bracket-arms and caps and brake-head arms and caps, substantially as set forth.

3. In a car-brake, the combination of brake-heads, and a pair of links pivoted to each other and adjustably connected to said brake-heads, substantially as set forth.

4. In a car-brake, the combination of brake-heads, rock-bars pivoted to said brake-heads, and a pair of links pivoted to each other and adjustably held to said rock-bars, substantially as set forth.

5. In a car-brake, the combination of a pair of brake-heads, links pivoted to each other and pivotally connected to said brake-heads, and a brake-lever connected to said links; said brake-lever being provided with a longitudinal slot to receive the connecting member of a brake-rod, substantially as set forth.

6. In a car-brake, the combination of a pair of brake-heads, links pivoted to said brake-heads, a rock-shaft, means of connection between said rock-shaft and said links, and a brake-lever fixed to said rock-shaft; said brake-lever being provided with a longitudinal slot to receive the connecting member of a brake-rod, substantially as set forth.

FRANK G. KOEHLER.

In presence of—
E. S. KNIGHT,
M. P. SMITH.